INVENTOR
FREDERICK E. FREY
ATTORNEY

Patented Apr. 1, 1947

2,418,255

UNITED STATES PATENT OFFICE 2,418,255

CATALYTIC DEHYDROGENATION OF HYDROCARBONS

Frederick E. Frey, Bartlesville, Okla., assignor to Phillips Petroleum Company, a corporation of Delaware Application September 9, 1940, Serial No. 356,080

3 Claims. (Cl. 260—683.3)

This invention relates to the endothermic catalytic conversion of organic compounds, and more particularly to the catalytic dehydrogenation of low-boiling hydrocarbons of two or more carbon atoms per molecule, especially those having less than six carbon atoms per molecule. This application is a continuation-in-part of my copending application Serial No. 305,549, filed November 21, 1939.

Dehydrogenation reactions involve an appreciable heat of reaction, which is absorbed by the reactants, so that they are considered to be endothermic reactions. Such reactions generally do not tend to approach completion at ordinary reaction temperatures, but are in constant competition with hydrogenation reactions, which tend to approach completion at lower temperatures. As a result, at any particular operating temperature, dehydrogenation approaches a maximum, where an equilibrium exists with the reverse reaction of hydrogenation, this maximum for dehydrogenation tending to increase with increased temperatures. There are also other potential reactions which can take place at dehydrogenation temperatures, which are generally more or less undesirable. When considering the dehydrogenation of hydrocarbons, such as the dehydrogenation of paraffins to produce olefins, or diolefins, or of olefins to produce diolefins, the most desirable reaction is a simple splitting off of hydrogen to form a less saturated hydrocarbon of the same number of carbon atoms such as an olefin, or a diolefin, with a carbon-atom structure corresponding to the original hydrocarbon, and free hydrogen. A major potential concomitant reaction involves the splitting of carbon-to-carbon bonds forming two or more smaller hydrocarbons, one of which is generally less saturated than the other. Broadly this can be considered to be dehydrogenation when in its simplest form, but it has the disadvantage of resulting in a somewhat different unsaturate than is produced by simple dehydrogenation, as well as an undesirable light paraffin, or the like, and further, when such reactions continue, there results a complete breakdown of the hydrocarbon material to carbon. However, when the reaction periods are short, and reaction temperatures are not excessively high, these less desirable reactions do not necessarily predominate, and substantial yields of products resulting from simple elision of hydrogen can be obtained. In most cases this result can be most readily obtained in the presence of dehydrogenation catalysts, the most desirable of which tend to promote selectively dehydrogenation reactions rather than reactions involving scission of carbon-to-carbon bonds, as well as to increase the speed of such reactions.

As just mentioned, dehydrogenation reactions are endothermic, and a considerable amount of heat must be supplied during the reaction period in order to promote the reaction. This is somewhat difficult to do under the most favorable conditions and this problem is increased to a certain extent when using dehydrogenation catalysts by the fact that most dehydrogenation catalysts are poor conductors of heat. In the past, endothermic catalytic conversion processes have generally been carried out by passing the reactant material through relatively small tubular catalyst chambers or through narrow catalyst-containing annular or equivalent zones. Catalyst chambers of these types are readily heated to a suitable temperature such that the catalyst is maintained at an appropriate reaction temperature. Many catalytic reactions in general are carried out commercially on a large scale by means of converters containing a number of such small and/or narrow catalyst containers arranged in heat-exchange relationship with a temperature-controlling and heat-supplying medium. Substantially equivalent systems in which temperature-controlling means are placed in contact with the catalysts, such as tubular members, positioned within a body or mass of catalyst and containing a liquid of suitable boiling or condensation point, or other temperature-controlling media, have also been proposed and used.

Such previously prepared catalytic conversion systems have a number of disadvantages, among which may be mentioned the high cost of manufacturing the many requisite chambers or containers; the high cost of certain widely used heat-exchange media such as mercury, diphenyl, and the like; the difficulty of making and maintaining fluid-tight connections and joints, especially in large numbers; the difficulties of charging and removing the catalyst; and the difficulty of preventing leakage of the heat-exchange medium, which like mercury, may be somewhat toxic as well as expensive.

Thermal reactions of an endothermic nature are readily carried out in continuous processes. An elongated tube coil with a rather restricted cross section can be placed within a suitable furnace, and heat can be readily supplied along the length of the tube coil while a stream of reactants is pumped through it and reaction proceeds. However, when it is desired to conduct a simple dehydrogenation such a procedure is generally not applicable, since cracking and other degradation reactions proceed to a substantial extent. An attempt to modify such simple apparatus to be used with catalysts has resulted in the complex catalyst chambers just discussed, with their attendant disadvantages.

It is an object of this invention to provide an improved process involving endothermic catalytic conversions.

Another object of this invention is to effect the catalytic dehydrogenation of hydrocarbons using simple, large masses of dehydrogenation catalyst.

A further object of my invention is to dehydrogenate hydrocarbons using a series of catalyst masses.

Other objects and advantages of my invention, some of which are referred to specifically herein, will be apparent from the accompanying disclosure.

I have now found that by a suitable combination of heating coils for the reactants and of comparatively massive catalyst chambers I can conduct catalytic dehydrogenations in an efficient manner using comparatively large catalyst masses in relatively simple catalyst chambers. I have also found that I can effect a satisfactory dehydrogenation, especially of certain hydrocarbon materials, by a cooperative combination of thermal and catalytic dehydrogenation, using simple large masses of dehydrogenation catalyst in the catalytic step. I have further found that such large bodies of catalyst are most preferably used under substantially adiabatic conditions, that is, they are most preferably used in well-insulated catalyst chambers, so that little or no heat gain or loss occurs through the walls thereof during the process, and the only addition or withdrawal of heat during the process occurs with the reactant and effluent streams. The advantages of the use of such substantially adiabatic catalyst chambers are most successfully realized by the use of a series of such chambers, heating the reactant material during its passage from one chamber to another, and/or adding highly heated fresh reactant material to the stream passing from one chamber to another. My invention is particularly adapted to the production of low-boiling olefins such as ethylene, propylene, butenes and pentenes and of diolefins such as butadiene, pentadiene, isoprene, and cyclopentadiene, from the corresponding more saturated hydrocarbons.

My invention is more clearly explained and disclosed in connection with flow diagrams of processes whereby it may be applied. It will now be described in connection with the accompanying drawing which forms a part of this specification, and in which Figures 1 and 2 are flow diagrams illustrating and exemplifying methods of practicing the invention.

Figure 1:
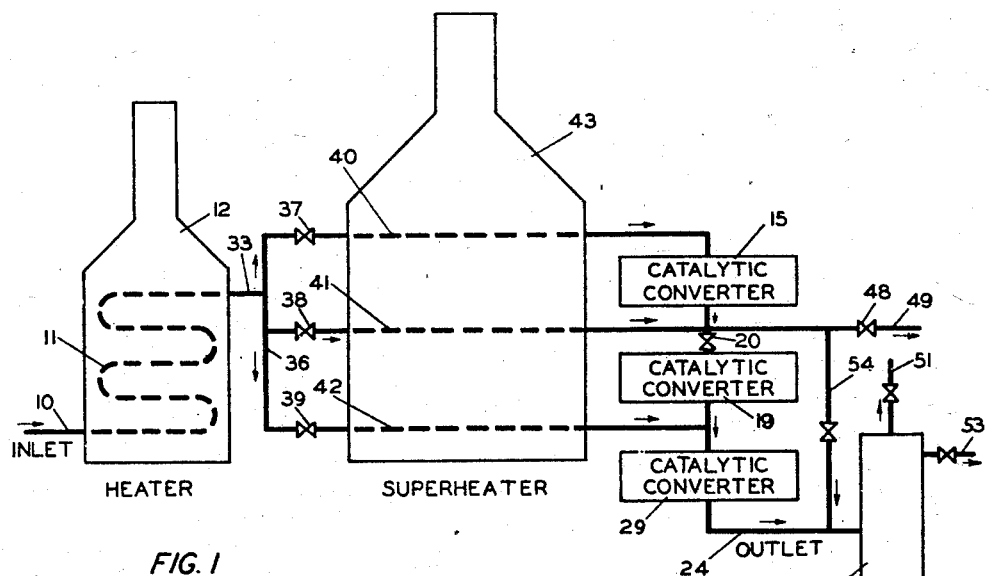
Figure 1 is an arrangement of apparatus wherein a series of catalyst chambers or catalytic converters is used, with additions of highly heated and/or partially reacted material to the reactant stream between successive converters.

With reference to the process exemplified in Figure 1, the reactant material that is to be subjected to an endothermic catalytic conversion enters the system through pipe 10, and receives an initial temperature increment in the coil 11, in heater 12, which is more often an economizer coil in the conduction part of a tube coil furnace. The stream then passes through pipe 33 to manifold 36 from which lead branch pipes or tube coils 40, 41, and 42 controlled by valves 37, 38, and 39 respectively. These coils are located in a superheater 43, which may comprise the radiant section of the same heating system or furnace of which heater 12 is a part. In the coils or tubes 40, 41, and 42 the temperature of the reactant stream is raised to a thermal reaction temperature, such as between about 1000 and 1300° F. for the dehydrogenation of low-boiling hydrocarbons, and maintained at this temperature for an appreciable period of time, so that a partial reaction occurs. However, this time is so controlled and limited that the maximum extent of total conversion is not approached and preferably not more than 50 per cent, and still more preferably, about 20 to 40 per cent, of this maximum conversion occurs. Thus, in the dehydrogenation of paraffin hydrocarbons to form olefins, the ultimate olefin content of the effluent will generally be between about 10 and 50 volume per cent, preferably about 15 to 40 per cent and the effluent of such a thermal step should contain only about 5 to 15 per cent by volume of olefins produced by reaction in this initial step. The stream from coil 40 passes to the catalytic converter 15, where it is contacted with a suitable catalytic material for the desired endothermic reaction, preferably a mass of solid, granular catalytic material. This converter, as well as other converters used in the process, is preferably of simple construction adapted to hold a single relatively large mass of catalyst, comprising a shell and a perforated false bottom upon which the catalyst mass rests, as is known in the art, and is preferably unheated and well insulated against heat loss. In one preferred form of operation, the maximum total conversion possible at the reaction temperature employed is not attained in converter 15, and the effluent thereof is passed into contact with a second mass of catalyst in converter 19. A portion of the initial charge stock heated in coil 41 to a temperature appreciably above the temperature of the effluent of converter 15 is added to this effluent in a substantial amount, so as to raise the temperature of the total stream, which is then passed into contact with the catalyst mass in converter 19. In a similar manner, the effluent of converter 19 may have added to it a hotter portion of the initial charge stock which has been heated in coil 42, and the combined material is passed into contact with a catalyst mass in converter 29. The effluent of 29 passes through outlet 24 for any desired subsequent treatment, such as fractionation and/or polymerization, and the like. In the apparatus shown, the effluent is passed to a separating means 50, where a separation may be effected between light hydrogen-containing gases which are removed through valved conduit 51 and an unsaturates-containing stream which is recovered through valved conduit 52. If desired, the separation means may include known selective separation steps whereby desired unsaturates are separated from more-saturated components, which are discharged through valved conduit 53. These latter may be recycled if desired.

In one modification of my invention, the material is heated in tubes 40, 41, and 42 to an extent sufficient to cause a substantial amount of uncatalyzed reaction or conversion, preferably less than one-half of the desired total amount of conversion as hereinabove stated, to occur before the material comes into contact with the catalytic contact masses in the catalytic converters 15, 19, and 29. It is preferable that superheating tubes 40, 41, and 42 be not immoderately extended and that they be arranged in parallel, as shown, as the desired objective is to obtain a high temperature in the reactant material rather than a high degree of thermal, uncatalyzed reaction. Furthermore, the interconnecting tubes between superheating tubes 40, 41, and 42 and converters 15, 19, and 29 are preferably as short as practicable so that the maximal proportion of sensible heat may be utilized in the subsequent endothermic catalytic conversion. Although in some cases it may be permissible to recombine the superheating coils so that all the reactant material must pass through each of the catalytic converters in turn, it is usually preferable to make use of the intermediate addition of freshly highly heated and partially cracked reactant material, shown in Figure 1, as thereby the different catalytic contact masses are more readily maintained at appropriate reaction temperatures; in some cases, a single superheating coil and/or a single catalyst mass may be employed, the effluent from the coil being distributed to the inlets of serially arranged catalyst zones. When a single catalyst mass is used, it is preferably placed in a somewhat elongated catalyst chamber with portions of heated charge being added to mix with the reactants at various points along the flow through the catalyst mass. The temperatures and rates of flow in superheating tubes 40, 41, and 42 may be regulated in any suitable manner, resulting in a high flexibility of control of reaction conditions in converters 15, 19, and 29. After passing through the last converter, such as converter 29, the converted hydrocarbon material leaves the system through outlet 24. As a simple modification, a single heating and noncatalytic reaction coil and a single catalyst mass may be used. Thus, the entire charge may be passed through coil 40, wherein a partial uncatalyzed reaction takes place, to chamber 15 and the effluent of chamber 15 is then passed directly from the system through outlet 49 and valve 48, valve 20 being closed, for further treatment as may be desired, or it may be passed through conduit 54 to separating means 50.

A feature illustrated and embodied by the arrangement shown in Figure 1 is the step of thermally dehydrogenating and/or cracking a part of a hydrocarbon starting material for the purpose of enhancing its over-all stability to further cracking, for the purpose of increasing the temperature of the reactant material, and for the purpose of making the reactant material carry a relatively large amount of sensible heat into the subsequent catalytic conversion wherein it then is available and used as endothermic heat of reaction. The attainment of these objectives leads to an over-all economy of heat and an over-all efficiency of operation not obtained by either thermal dehydrogenation or catalytic dehydrogenation alone, nor by aggregations of similar but separately conducted thermal and catalytic steps. A generally suitable amount of partial cracking is 1 to 15 per cent, and a preferred amount is 5 to 10 per cent. Too large an extent of cracking, particularly of easily degraded hydrocarbons such as normal butane, or normal pentane, is undesirable because of excessive loss to methane and other economically inferior products. But in certain cases, such as that of isobutane, which is thermodynamically more resistant to degradation and is more cleanly thermally dehydrogenated than normal butane, a larger amount of thermal decomposition, such as 15 to 30 per cent or more, is not only feasible but sometimes highly advantageous.

The arrangement illustrated in Figure 1 is especially advantageous for use with dehydrogenation catalysts of the type of bauxite or activated alumina, which are generally incapable of a superlative degree of activity and which require a relatively high temperature for effecting efficient conversion, or with partially spent or partly deteriorated chromium oxide-containing catalysts capable of withstanding the high temperature in question. In any case the suitability of any particular catalyst for use in this arrangement may be readily determined by trial. In some instances the efficiency of utilization of the superheat may be bettered by the use of a catalyst of high-temperature type and, immediately downstream, of a catalyst of low-temperature type capable of effecting dehydrogenation at the temperature, partly lowered by reaction, at which the hydrocarbon stream leaves the high-temperature catalyst.

Figure 2:
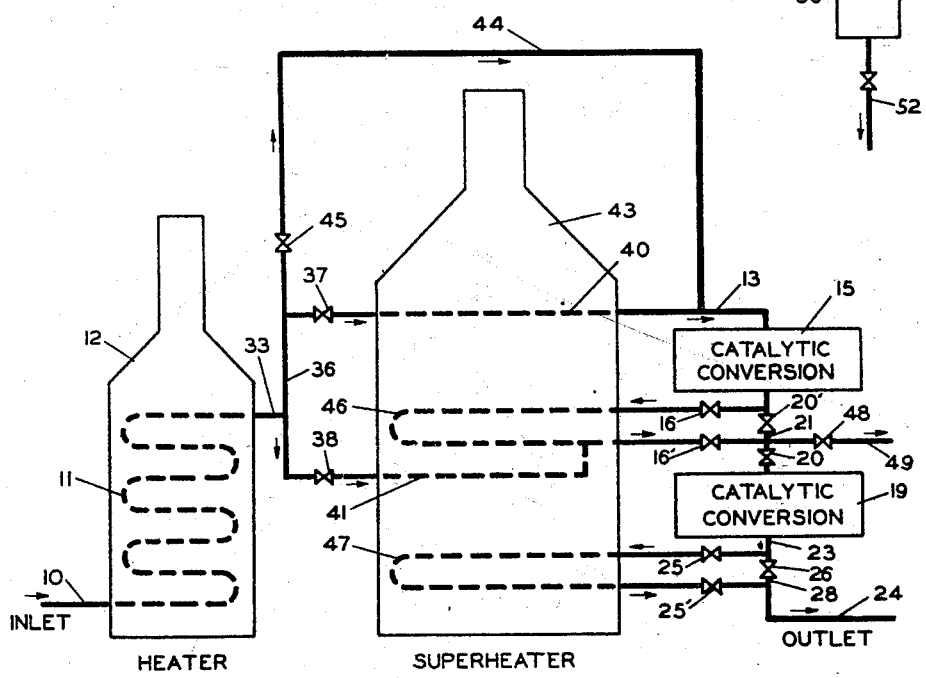
Figure 2 is an alternative arrangement which permits more accurate temperature control.

Figure 2 shows another arrangement that is advantageously useful for endothermic catalytic conversions, such as the dehydrogenation of hydrocarbons, and is especially useful for the dehydrogenation of normal butane and the pentanes to olefins and also of these paraffins and the corresponding olefins to diolefins. In this arrangement, the reactant material enters through inlet 10; is heated in coil 11 of heater 12 to a temperature at which substantially no thermal or homogeneous cracking occurs but generally one at which conversion would take place in the presence of a suitable catalyst; and then passes through pipe 33, to manifold 36, from which branch a plurality of tubes such as 40, 41, and 44, provided with control valves 37, 38, and 45, respectively, for proportioning and controlling the rate of flow of the material flowing therethrough. Material flowing from manifold 36 through valve 37 enters superheating tube 40, wherein it is heated to an extent sufficient to cause a substantial amount of thermal cracking to occur before it comes into contact with the catalytic contact mass in catalytic converter 15. Material flowing through pipe 44, on the other hand, is not superheated but remains at substantially the temperature acquired in coil 11. Hence, by controlling the relative rates of flow through tube 40 and pipe 44 by means of valves 37 and 45, the temperature of the material entering converter 15 is readily adjusted to suit the particular catalytic contact mass in converter 15, which advantageously may be a contact mass of superlative activity, such as certain of the chromium oxide-containing catalysts mentioned herein. In converter 15 the material undergoes partial conversion and is thereby cooled because of the endothermic nature of the reaction.

If desired, the material flowing through tube 40 may be heated to a temperature below that at which substantial thermal cracking or decomposition takes place during the heating period used, such as the maximum temperature at which the catalytic reaction may be conducted over the catalytic contact mass without excessive carbonization or deposition of carbonaceous matter on the catalyst. Then the arrangement shown in Figure 2 facilitates making a gradual change in the temperature of the reactant material to overcome or to balance a gradual deactivation of the catalytic contact mass, whereby a substantially constant rate of catalytic conversion is maintained in converter 15 while the material passes therethrough at a constant over-all rate of flow. Thus, when the catalytic contact mass is fresh, substantially all of the reactant stream may be passed through pipe 44 and none through tube 40, but as the catalytic contact mass gradually becomes deactivated, more and more material may be diverted from pipe 44 to tube 40 to raise the temperature of the total material entering converter 15. Finally, when the contact mass becomes greatly deactivated, substantially all of the reactant material may be passed through tube 40 and none through pipe 44.

After passing through converter 15 of Figure 2 the partially converted material may be passed directly through valves 20' and 20 and pipe 21 into the catalytic contact mass in catalytic converter 19, wherein further reaction may take place without additional or intermediate heating if the contact mass is of sufficiently high catalytic activity. Alternatively, if intermediate heating is desirable, the material may be passed through valve 16 into tube 46 heated in superheater 43, wherein its temperature may be raised to any desired extent before it enters converter 19 through valve 20; for example, to a temperature below that at which substantial cracking occurs or to one whereat an appreciable amount of cracking does take place, depending somewhat on the properties of the catalytic contact mass and/or the material being converted. If desired, the thermal cracking may be sufficient to increase the over-all conversion to the total desired, and the converted stream may be withdrawn from the system, as through valve 48 and outlet 49. Alternatively again, part of the partially converted material from converter 15 may be passed through valve 20' and pipe 21 and the remainder through valve 16, and tube 46, in accordance with the temperature requirements in hand.

In addition to the foregoing modes of procedure, additional or fresh material may be added to the stream before it comes into contact with the contact mass in converter 19, as by means of control valve 38, and tube 41, wherein the additional material is heated to any desired temperature, which may or may not be high enough to cause a partial thermal cracking, depending upon the desired conditions of operation. When the treatments in coil 40 and catalyst chamber 15 effect a sufficient conversion, as is often the case, the effluent of the chamber 15 can be recovered through valve 20' and 48 and pipe 49, valves 16, 16' and 20 being closed. By the various foregoing procedures, a remarkably flexible and advantageous control of operating conditions may be readily obtained.

If desired, additional elements similar to pipe 21, tubes 41 and 46, control valves 16, 20', and 38, and catalytic converter 19 may be added to the simple arrangement shown in Figure 1 or 2 as at point 23 in outlet 24, whereby further catalytic conversion may be obtained by proceeding in a manner that will be obvious to those skilled in the art.

After leaving the last catalytic converter, the converted stream, carrying the products of the conversion and any unreacted material, may be passed out of the system through valve 26, pipe 28, and outlet 24; or it may be passed through valve 25, valve 26 being closed, into superheating tube 47, wherein it may be heated to a temperature causing substantial homogeneous or thermal conversion of material that escaped catalytic conversion in the converters.

It will of course be appreciated that in the modifications of Figures 1 or 2 the single preheating coil 11 through which all the charge is passed for the separate coils 40, 41, and 42 may be either completely eliminated, or replaced by separate preheating coils for each of the individual superheating coils.

The combination of a partial thermal conversion followed immediately by a catalytic conversion is more readily applied to some materials than to others. Thus, in the dehydrogenation of light hydrocarbons to form unsaturated hydrocarbons suitable for subsequent conversion to motor fuel or other heavier products, I find that this arrangement can be readily and profitably applied to a charge stock comprising essentially one or more of the three lightest hydrocarbons heavier than methane, that is, ethane, propane, and/or isobutane, especially when the olefins produced by the treatment of isobutane are to be catalytically converted to liquid hydrocarbons in the motor-fuel boiling range and when the olefins produced from ethane and/or propane are to be subjected to thermal conversion to motor fuel. Such a modification can also be applied to cyclopentane to produce cyclopentene and/or cyclopentadiene. The simple catalytic dehydrogenation of isobutane produces predominantly isobutylene which, when polymerized, yields isooctenes, or which, when reacted with an isoparaffin such as isobutane or isopentane by alkylation, produces isooctanes or isononanes, as the case may be. While these materials are very desirable as constituents of motor fuels, they do not in themselves constitute desirable modern gasolines because of their restricted boiling ranges, such as determined by the method identified as A. S. T. M. procedure D 86–38. I have found that, when it is desirable to produce a motor fuel from isobutane directly, a more desirable charge stock can be prepared by my process since appreciable amounts of propylene are also produced along with isobutylene. When the resulting olefin mixture is subjected to catalytic polymerization, as in my above-identified copending application Serial No. 305,549, this propylene also enters into reaction so that a polymer product results which is more nearly a balanced motor fuel from the point of view of distillation range and volatility. A similar result is obtained when the olefins so produced are charged to an alkylation process and caused to react with a material such as isobutane or isopentane in the presence of concentrated sulfuric acid, sodium chloro-aluminate, concentrated hydrofluoric acid, or the like. Likewise, when olefins resulting from the dehydrogenation of ethane and/or propane are to be reacted with heavier paraffins to produce a motor fuel, as in my copending application Serial No. 82,954, filed June 1, 1936, which issued as Patent No. 2,270,700, the practice of this modification of my invention results in the economical production of an olefin mixture containing appreciable amounts of both ethylene and propylene, which enter into the alkylation reaction to produce a saturated product with a well-balanced distillation range.

However, this feature is not so readily applied to hydrocarbons higher boiling than isobutane, such as normal butane, normal pentane and isopentane, and the like. For example, when normal butane is subjected to extensive uncatalyzed dehydrogenation, a considerable part of the conversion consists of the formation of ethane and ethylene, and methane and propylene, and only about 10 per cent of the reaction forms free hydrogen and butylenes. The ethane and methane represent a loss of a considerable part of the original hydrocarbon material, while the ethylene does not readily enter into subsequent reactions under the conditions most favorable for the reaction of normal butylenes produced directly from normal butane by simple catalytic dehydrogenation. A similar situation exists with respect to higher-boiling hydrocarbons and hydrocarbon fractions. For these materials a different modification of my invention, which includes the use of two or more catalytic converters, with intermediate introduction of highly heated reactant material, which nevertheless is substantially unconverted, is more to be preferred. With such a modification, the charge stock is very rapidly heated to a temperatuure in or near the range of thermal conversion and is not retained for a long period at this temperature but is immediately passed into contact with a catalyst which will promote the desired simple dehydrogenation rather than allowing scission of carbon-to-carbon bonds to take place to an appreciable extent. Such a modification is particularly adapted to the production of butadiene, pentadiene, isoprene, and the l'ke from the corresponding more-saturated hydrocarbons.

In these modifications the lengths of the heating periods are not readily defined in terms of seconds, since the effects of maintaining the charge at any temperature for any period of time is dependent on the temperature, pressure, and the hydrocarbon material. Such effects are well known to the art, and can be readily determined by trial by one skilled in the art for any particular instance.

The use of a chromium oxide gel catalyst for the dehydrogenation of hydrocarbons has been disclosed by Huppke and Frey in U. S. Patent No. 1,905,383. Other chromium oxide-containing catalysts suitable for dehydrogenation, especially of hydrocarbons, have been disclosed by Frey and Huppke in U. S. Patent No. 2,098,959, and in the following copending applications: Morey, Serial No. 113,091 filed November 27, 1936, now Patent No. 2,288,320, Matuszak and Morey, Serial No. 173,708 filed November 9, 1937, now Patent No. 2,294,414; and Morey and Frey, Serial No. 173,709 filed November 9, 1937, Patent No. 2,312,572. In general, these latter catalysts comprise unglowed chromium oxide obtained by nonspontaneous thermal decomposition of chromium compounds such as hydrated chromic oxide, ammonium-containing salts of chromic acid, and the like. These catalysts are preferred when it is not necessary to use excessively high dehydrogenation temperatures and/or when the process is operated to produce appreciable quantities of diolefins in the effluent with a minimum of secondary reactions. At other times other catalysts are cheaper and entirely suitable, such as granular synthetic alumina, or bauxite or other aluminiferous natural materials, with or without promoters such as compounds of chromium, zirconium, molybdenum, titanium, and the like.

Example I

As an example of the application of one modification of my invention, a butane fraction containing over 90 per cent of isobutane may be rapidly heated, under a pressure of about 25 pounds per square inch gauge, to a temperature of about 1200° F. and maintained at that temperature for about four seconds. About 11 per cent of the charge stock undergoes a noncatalytic conversion, forming isobutylene and propylene in a molar ratio of about 1.4:1. The effluent stream is passed directly over granular bauxite, of 8 to 20 mesh, contained as a single mass in a large insulated catalyst chamber, with a sufficient amount to result in the passage of about 1000 volumes of charge stock, measured as a gas at atmospheric conditions, per volume of catalyst per hour. This results in an additional conversion of about 8 per cent of the remaining isobutane of which about 85 per cent is converted directly to isobutylene. The temperature drop of the material passing through the catalyst chamber is about 85° F. from inlet to outlet. The effluent of the catalyst chamber is passed to separating means, and hydrogen and hydrocarbons lower-boiling than propylene are separated and removed. The resultant material, comprising essentially isobutylene, propylene and isobutane, is subjected to catalytic polymerization under conditions adapted to react propylene with isobutylene to produce hydrocarbons in the motor-fuel boiling range. The polymer product contains isohexenes, isoheptenes, isooctenes, and isodecenes, along with other hydrocarbons, and after being nondestructively hydrogenated, has an octane number of about 88, an excellent response to the addition of tetraethyl lead, and a well-balanced A. S. T. M. distillation curve.

Example II

As an example of another modification of my invention, a normal butane fraction from natural gas may be passed at about 30 pounds per square inch gauge through the preheat section of a furnace, and then in four streams through the radiant section of the furnace. This is preferably done in a cylindrical radiant section, with tubes for each stream in a quadrant and parallel to the axis. Three of the streams are rapidly heated to a temperature of about 1300° F., with only about seven per cent of the charge undergoing noncatalytic decomposition. The fourth stream is rapidly heated to a temperature of about 1200° F., and is passed directly to a large insulated catalyst chamber containing granulated hard crushed bauxite. The three hotter streams are passed to the catalyst chamber at different points, one at about 25 per cent of the distance from the inlet, one at about 45 per cent of this distance, and the third at about 65 per cent of this distance. Sufficient bauxite is used to result in an overall average rate of passage of the charge of about 750 volumes, measured as a gas at atmospheric conditions, per volume of granular catalyst per hour. The total effluent of the chamber, at a temperature of about 1040° F., contains about 23 per cent of gaseous unsaturated hydrocarbons of which about 80 per cent is butenes, along with small amounts of butadiene which may be recovered also. Normal butenes so produced may be subjected to further dehydrogenation to produce additional butadiene.

When it is desired to follow the present teachings to produce butadiene by dehydrogenation of a normal butane-butene mixture, as in my copending application Serial No. 354,890, filed August 30, 1940, now Patent 2,371,817, an operation similar to that of Example II may be followed, but preferably with a minimum of initial uncatalyzed reaction, and also with the use of an unglowed chromium oxide catalyst.

Many modifications and variations of this invention may obviously be used, and can be adapted by one skilled in the art without departing from the spirit of the disclosure. The restrictions used in the examples, and in connection with the drawing, need not necessarily be used as limits for all particular operations or sets of conditions, since they are presented primarily as illustrative examples. It will be understood that the flow diagrams presented and described as a part of the disclosure are schematic only, and that many additional conventional pieces of equipment, such as pressure gauges, valves, pumps, heat exchangers, reflux lines and accumulators, heaters and coolers, and the like, will be necessary for any particular installation, and can be supplied to meet the requirements of any particular case by anyone skilled in the art. The essential equipment and conditions have been described and the modifications disclosed in sufficient detail to serve as efficient guides.

Reference is made to my applications Serial Nos. 483,435 and 483,436, filed April 17, 1943, which claim subject matter disclosed but not claimed herein.

I claim:

1. A method of carrying out endothermic conversions, which comprises subjecting a reactant material to such conditions of elevated temperature and time of heating as to effect a substantial partial thermal conversion, passing the partially converted material without separation or substantial temperature loss through a series of catalytic contact masses substantially free from heat-exchange relationship with temperature-controlling media to effect endothermic reactions whereby said material is cooled, and adding portions of said thermally partially converted material at an elevated temperature to the reactions between successive contact masses.

2. A process for dehydrogenating low boiling hydrocarbons of at least two carbon atoms per molecule, which comprises subjecting a portion of such a hydrocarbon material to be dehydrogenated in the absence of a catalyst to a reaction temperature between about 1000 and 1300° F. under a pressure not greater than about 100 pounds per square inch for a period of time adapted to effect a production of 5 to 15 per cent of olefin hydrocarbon material in the effluent, subjecting the effluent without a substantial reduction of temperature to the action of a first large mass of solid granular dehydrogenation catalyst substantially free from heat-exchange relationship with temperature-controlling media to effect further dehydrogenation, subjecting a second portion of said hydrocarbon material in the absence of a catalyst to the said reaction conditions, admixing the said second portion so treated with the effluent of said first catalyst mass and subjecting the resultant mixture without substantial reduction of temperature to the action of a second large mass of solid granular dehydrogenation catalyst substantially free from heat exchange relationship with temperature-controlling media to effect additional dehydrogenation.

3. A process of dehydrogenating $C_2$ to $C_5$ hydrocarbons in which the predominant reaction is simple splitting off of hydrogen to form the corresponding less saturated hydrocarbon of the same number of carbon atoms and the same carbon skeleton as the original hydrocarbon which comprises splitting a stream consisting essentially of said hydrocarbons into a plurality of parallel substreams of identical composition, heating each of said substreams to a thermal reaction temperature of between about 1000° and 1300° F., maintaining said substreams at said temperature and under such conditions for a period of time such that thermal dehydrogenation of said hydrocarbons takes place to the extent of 20 to 40% of the total dehydrogenation effected in said process both thermally and catalytically, passing the effluent from said thermal treatment of one of said substreams at the effluent temperature over a large mass of solid dehydrogenation catalyst which is unheated and insulated against heat loss and therein catalytically further dehydrogenating the hydrocarbons derived from said one of said substreams, commingling the effluent from said catalyst at the effluent temperature with the effluent from said thermal treatment of a second of said substreams at the effluent temperature so as to impart a catalytic dehydrogenation temperature to the total stream, and passing said total stream at the resulting temperature over a second large mass of solid dehydrogenation catalyst which is unheated and insulated against heat loss and therein catalytically further dehydrogenating the hydrocarbons contained therein.

FREDERICK E. FREY.

REFERENCES CITED

The following references are of record in the file of this patent:

UNITED STATES PATENTS

| Number | Name | Date |
|---|---|---|
| 2,125,714 | Fulton | Aug. 2, 1938 |
| 2,216,470 | Forney | Oct. 1, 1940 |
| 2,129,142 | Kuentzel et al. | Sept. 6, 1938 |
| 2,209,458 | Heard et al. | July 30, 1940 |
| 2,183,591 | Schulze | Dec. 19, 1939 |
| 2,127,953 | Drennan | Aug. 23, 1938 |
| 2,161,247 | Dearborn | June 6, 1939 |
| 2,249,924 | Wilson | July 22, 1941 |
| 2,273,089 | Carpenter | Feb. 17, 1942 |
| 2,278,223 | Sturgeon | Mar. 31, 1942 |
| 2,331,427 | Schulze et al. | Oct. 12, 1943 |
| 2,349,045 | Laying et al. | May 16, 1944 |
| 2,366,567 | Schultz | Jan. 2, 1945 |

OTHER REFERENCES

Egloff, "Reactions of Pure Hydrocarbons," Reinhold 1937, New York, pages 143 and 166.